(12) United States Patent
Kulkarni

(10) Patent No.: US 7,297,721 B2
(45) Date of Patent: Nov. 20, 2007

(54) PROCESS FOR CONTROLLED POLYMERIZATION OF A MIXED POLYMER

(75) Inventor: Sanjay Tammaji Kulkarni, Chennai (IN)

(73) Assignee: Futura Polyesters Limited, Mumbai (IN)

( * ) Notice: Subject to any disclaimer, the term of this patent is extended or adjusted under 35 U.S.C. 154(b) by 527 days.

(21) Appl. No.: 10/868,878

(22) Filed: Jun. 17, 2004

(65) Prior Publication Data

US 2005/0187306 A1    Aug. 25, 2005

Related U.S. Application Data

(60) Provisional application No. 60/479,919, filed on Jun. 20, 2003.

(51) Int. Cl.
*C08J 11/04* (2006.01)
(52) U.S. Cl. ........................................ 521/48; 521/48.5
(58) Field of Classification Search .................. 521/48, 521/48.5
See application file for complete search history.

(56) References Cited

U.S. PATENT DOCUMENTS

| | | | |
|---|---|---|---|
| 4,020,049 A | 4/1977 | Rinehart | |
| 4,118,187 A | 10/1978 | Sidebotham et al. | |
| 4,368,274 A | 1/1983 | Scott | |
| 4,609,680 A | 9/1986 | Fujita et al. | |
| 5,223,544 A | 6/1993 | Burkett et al. | |
| 5,539,078 A | 7/1996 | Burkett et al. | |
| 5,554,657 A | 9/1996 | Brownscombe et al. | |
| 5,594,092 A | 1/1997 | Burkett et al. | |
| 5,612,423 A | 3/1997 | Burkett et al. | |
| 5,635,584 A | 6/1997 | Ekart et al. | |
| 5,874,515 A | 2/1999 | Huang et al. | |
| 5,876,644 A | 3/1999 | Nichols et al. | |
| 5,895,807 A | 4/1999 | Galko et al. | |
| 6,162,837 A | 12/2000 | Gerking et al. | |
| 6,262,294 B1 | 7/2001 | Sako et al. | |
| 6,350,851 B1 | 2/2002 | Inada et al. | |
| 6,410,607 B1 | 6/2002 | Ekart et al. | |
| 6,436,322 B1 | 8/2002 | Fredl | |

FOREIGN PATENT DOCUMENTS

| | | |
|---|---|---|
| EP | 0 926 178 A1 | 6/1999 |
| EP | 1153070 B1 | 6/2002 |
| EP | 0966344 B1 | 8/2002 |
| JP | 2001-316327 A | 11/2001 |
| NZ | 517832 | 3/2001 |
| WO | WO 98/40194 A1 | 9/1998 |
| WO | WO 00/47659 A1 | 8/2000 |
| WO | WO 01/21373 A1 | 3/2001 |

*Primary Examiner*—Edward J. Cain
(74) *Attorney, Agent, or Firm*—Birch, Stewart, Kolasch & Birch, LLP

(57) ABSTRACT

The present invention provides a process for the preparation of high molecular weight crystalline Polyethyleneterephthalate (PET) using up to 50% of Post consumer recycled PET flakes along with Pure Terephthalic Acid (PTA), Isophthalic Acid (IPA) and Mono Ethylene Glycol (MEG) as a virgin raw material, in the presence of a combination of catalysts and additives to obtain an intermediate prepolymer heel having a low degree of polymerization further subjecting to autoclaving to yield an amorphous melt and followed by solid state polymerization.

18 Claims, 1 Drawing Sheet

PCR PET SSP RESIN - PROCESS FLOW CHART

PROCESS FOR CONTROLLED POLYMERIZATION OF A MIXED POLYMER

Figure 1:
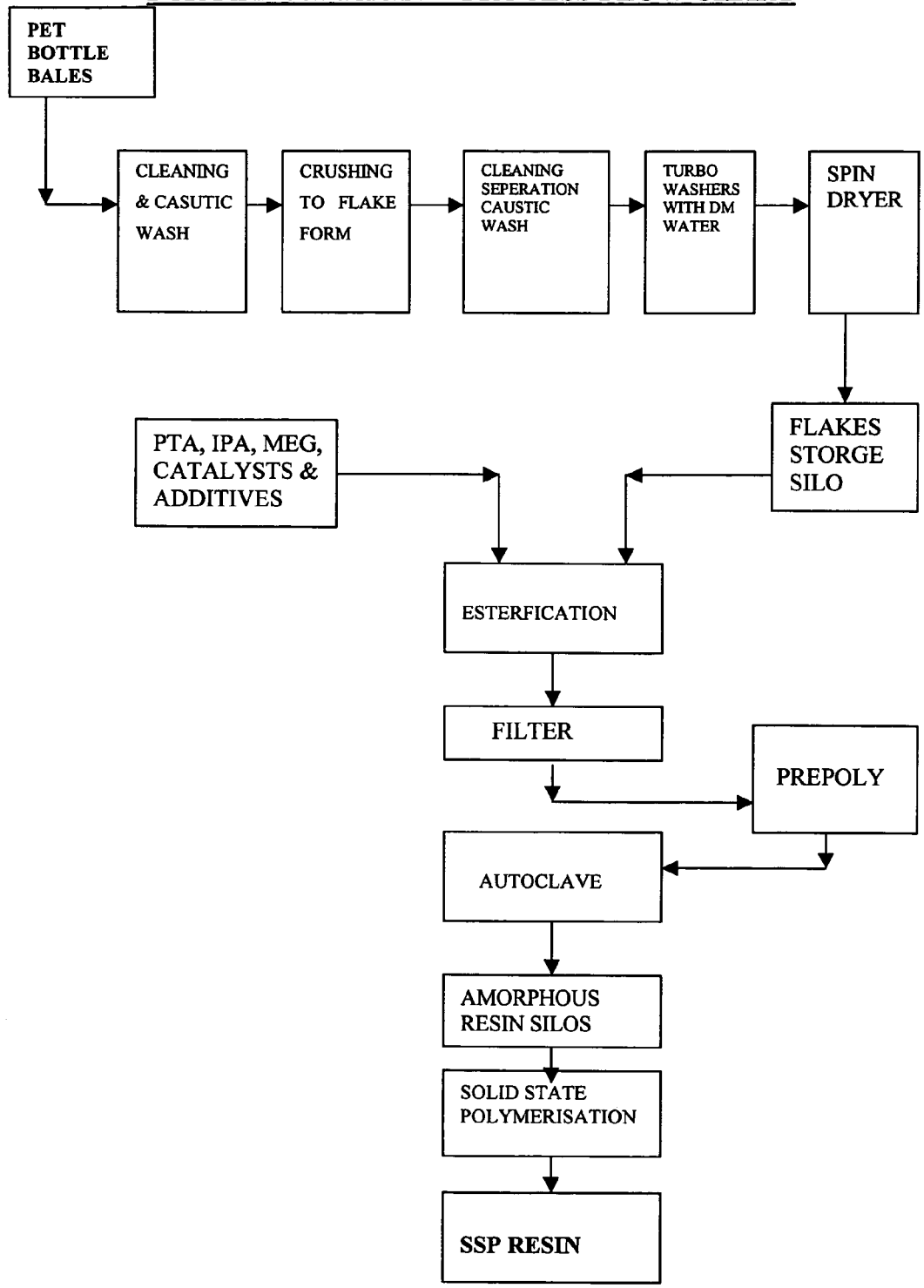

This Non-provisional application claims priority under 35 U.S.C. § 119(e) on U.S. Provisional Application No(s). 60/479,919 filed on Jun. 20, 2003, the entire contents of which are hereby incorporated by reference.

TECHNICAL FIELD

The present invention relates to a process for the preparation of high molecular weight crystalline Polyethyleneterephthalate (PET) using up to 50% of Post consumer recycled PET flakes along with Pure Terephthalic Acid (PTA), Isophthalic Acid (IPA) and Mono Ethylene Glycol (MEG) as a virgin raw material, in the presence of a combination of catalysts and additives to obtain an intermediate prepolymer heel having a low degree of polymerization (DP) further subjecting to autoclaving to yield an amorphous melt and followed by solid state polymerization. The repolymerized PET obtained from a maximum of 50% of post consumer recycled PET bottle flakes (PCRPET) has properties similar to the PET produced from virgin raw materials and is suitable for manufacturing PET bottles used in food contact application.

BACKGROUND AND PRIOR ART REFERENCES

Prior work regarding glycolysis of PET and PET bottle flakes to BHET/Oligomers are disclosed in a number of Patents viz., EP 0926178, EP 1153070, EP 0966344, U.S. Pat. No. 646,322, U.S. Pat. No. 5,635,584 etc. However most of these relate to separation of BHET, its purification and repolymerization to PET or direct extrusion.

JP 2001-316327 describes a process for producing oligomers by subjecting PET and MEG to a depolymerization reaction in the presence of depolymerization catalysts. This patent claims a method to produce ester oligomer from PET using a depolymerization catalyst. Whereas in the present invention, complete depolymerization of the flakes by glycolysis/depolymerization are not carried out.

N.Z. Patent 0517832 discloses a process for preparing food contact PET resin from waste PET containers. The process comprises producing clean flakes by washing, rinsing and drying the flakes and subsequently melting the flakes and extruding it to form strands which are cut into granules. Unless carefully controlled this process has the disadvantage of degradation of PET while extruding a high molecular weight PET. In addition, in the instant process foreign impurities are not removed.

U.S. Pat. No. 5,554,657 describes a process for recycling PCR. However the method is for mixed PCR containing polymers from which PET is selectively dissolved and separated by a solvent. From this solution PET is separated, cleaned, combined with virgin PET and further processed by polymerization to the required high molecular weight polymer. In this process the quality of the products is not to the desired standards.

U.S. Pat. No. 6,350,851 deals with producing high purity BHET from PET flakes by a glycolysis procedure. The purified BHET is then polymerized by using $Sb_2O_3$ and $GeO_2$ as combination catalysts. It is obvious that this process is for 100% recycle of PCR and that too by separating the BHET and subsequently polymerizing which involves more steps. In this work the depolymerized material consisting of MEG+BHET was decolorized with activated carbon. This solution was subsequently deionized with anion-cation exchange resin. The deionized solution was then charged into an autoclave for polymerization. So it is obvious at each stage the BHET is separated and processed.

U.S. Pat. Nos. 6,263,294, 5,539,078, 5,594,092, 5,612,423, 5,895,807, 4,609,680 and 4,020,049 all deal with prepolymer heel in the process of making PET. However these disclosures mainly deal with virgin PET or PEN polymers and not with recycle of PCR.

U.S. Pat. No. 5,876,644 deals with a process of directly extruding PRC flakes to a low molecular weight melt and blending this melt with a melt of virgin polyester prepolymer to get a blended prepolymer which is subsequently solid state polymerized. In this process there is no glycolysis of the flakes. The flakes are melted as such in an extruder to a slightly lower molecular weight material. This material is then blended with virgin melt and polymerized further. This process is a direct extrusion of flakes wherein the flakes are not reacted with any chemical.

U.S. Pat. Nos. 6,410,607, 6,162,837, 5,223,544, 4,368,274 and 4,118,187 disclose PET scrap utilization to produce PET. These disclosures do not deal with the simultaneous process of recycling PCR flakes along with virgin RM viz. PTA, IPA and MEG.

OBJECTS OF THE INVENTION

The main object of the present invention is to provide a process for controlled polymerization to obtain high molecular crystalline PET using a mixture of PCRPET flakes, PTA, IPA and MEG in appropriate proportions.

Another object of the present invention is to provide simultaneous esterification, melting, glycolysis of PET flakes along with virgin raw materials.

Another object of the invention is to provide a combination of catalysts for an effective polymerization.

Still another embodiment of the invention is to provide use of toners, optical brighteners and heat stabilizer as additives.

Yet another object of the invention is to provide an intermediate pre-polymer heel BHET with low degree of polymerization.

Still another object of the invention is to provide food grade PCRPET.

Still another object of the present invention is to provide reduced use of MEG in the process by the formation and retention of an intermediate pre-polymer heel BHET in the esterification reactor.

It is also an object of the present invention to provide a process that is most economical and resulting in a product having the quality of a virgin PET.

SUMMARY OF THE INVENTION

According, the present invention provides a process for the preparation of high molecular weight crystalline Polyethyleneterephthalate (PET) using up to 50% of Post consumer recycled PET flakes along with Pure Terephthalic Acid (PTA), Isophthalic Acid (IPA) and Mono Ethylene Glycol (MEG) as a virgin raw material, in the presence of a combination of catalysts and additives to obtain an intermediate prepolymer heel having a low degree of polymerization further subjecting to autoclaving to yield an amorphous melt and followed by solid state polymerization. The present invention also relates to continuous process for the preparation crystalline PCRPET by retaining up to 30% of prepolymer heel formed in the esterification reactor and performing the cycle. The repolymerized PET obtained from a maximum of 50% of post consumer recycled PET bottle flakes (PCRPET) has properties similar to the PET produced from virgin raw materials and is suitable for manufacturing PET bottles used in food contact application.

DETAILED DESCRIPTION OF THE INVENTION

In accordance to the objects, the present invention provides a process for the preparation of a high molecular weight food grade polyehtyleneterephthalate, said process comprising steps of:
  (a) processing by adding PCRPET flakes to the paste form of virgin PTA, isophthalic acid (IPA), monoethylene glycol (MEG) and additives in the esterification reactor to obtain an esterified material,
  (b) retaining about 20-30% of the esterified material of step (a) in the esterification reactor, filtering the rest of the esterified material formed as a prepolymer heel of uniform quality,
  (c) transferring the pre-polymer of step (b) into a prepoly reactor while maintaining a temperature in the range of 240-255° C. for a maximum period of 60 minutes to achieve an I.V. of about 0.3 dl/g,
  (d) charging the material of step (c) into an autoclave at a temperature in the range of 284-300° C. to achieve a degree of polymerization in the range of 100-110 to obtain an amorphous polymer melt;
  (e) subjecting the amorphous polymer melt of step (d) to solid state polymerization to obtain food grade crystalline PET, and
  (f) preferably continuing the process cycle by adding an appropriate quantity of PCRPET flakes, PTA, IPA and MEG to the retained esterified material of step (b) and performing steps (c) to (e) to obtain continuous production of crystalline food grade PET resin, In an embodiment of the invention provides a process wherein the amount of PCRPET flakes used in the preparation of high molecular weight food grade PET is in the range up to a maximum of 50% by weight of the PTA and IPA required.

Another embodiment of the invention the additives are selected from catalysts, optical brighteners, toners and heat stabilizers.

Another embodiment of the invention the catalysts used in the said process is selected from antimony trioxide, germanium-di-oxide or combination thereof; the optical brighteners are selected from commercially available food grade brighteners and the heat stabilizers are selected from group consisting of TEPA, organic titanates and other similar materials.

In another embodiment of the invention, the esterification reaction in step (a) is carried out at a temperature in the range of about 240-270° C., a pressure in the range of 0.5 to 3 kgs/cm2 under nitrogen atmosphere for a time period of about 120 minutes.

Still yet another embodiment of the invention, the degree of polymerization of the prepolymer is in the range of about 5 to 10.

In another embodiment of the invention, the filtration is carried out using filter-material of size about 20 micron under nitrogen pressure.

In another embodiment of the invention the polymerization reaction in the pre-poly reactor is carried out at a temp range of 240-255° C. for a period of maximum 60 minutes with a degree of polymerization of the prepolymer in the range of 5 to 10.

In another embodiment of the invention to obtain amorphous polymer melt in step (d) the reaction is carried out in an autoclave at a temperature in the range of 284-300° C. to achieve a degree of polymerization in the range of 100-110 and is stabilized with heat stabilizers.

Further, colour of the polymer melt of step (d) may be improved by the addition optical toners and said amorphous polymer melt is extruded under nitrogen pressure and converted in to chips/granules.

The solid state polymerization of step (e) is carried out at a temperature in the range of 210-240° C. for a period ranging from ten to sixteen hours resulting in a degree of polymerization (DP) of about 140-160.

One more embodiment of the invention wherein PCRPET flakes are obtained by collecting post consumer PET bottles scrap, cleaning the bottles with caustic, crushing to obtain flakes, further caustic cleaning of the flakes, turbo washing and washing with DM water to obtain flakes which are free from any impurities.

In a preferred embodiment of the invention is to provide a continuous process for production crystalline food grade PCRPET by adding PTA, IPA, MEG and other additives to the prepolymer heel content of upto 30% in the esterification reactor.

Another embodiment of the invention is to provide repolymerized PET obtained from a maximum of 50% of post consumer recycled PET bottle flakes (PCRPET) which has similar properties to the PET produced from virgin raw materials and is suitable for manufacturing PET bottles used in food contact application.

BRIEF DESCRIPTION OF THE ACCOMPANIED DIAGRAM

FIG. 1 represents a flow chart describing various process steps of the present invention.

DESCRIPTION OF THE PROCESS

The PCR PET bottles received in the form of bales are opened. The individual bottles are segregated, cleaned and caustic washed. These clean bottles are then crushed to get the PCR PET in the form of flakes. These flakes are then processed to remove non PET material, if any, and caustic washed followed by a turbo wash to remove any adhering trace impurities. The flakes are then washed with demineralized water and dried. Appropriate quantities of the clean dry flakes and the required quantities of PTA/IPA/MEG are charged into the esterifier which contains a prepolymer heel. After esterification the prepolymer formed is transferred to autoclave through prepolyreactor containing 20 micron filter. Polymerization takes place in the autoclave and after achieving required I.V. the product is taken out an amorphous resin. The amorphous resin is further subjected to Solid State Polymerization (SSP) to obtain the required high I.V. in the crystalline PCR PET resin.

The reaction of the present invention is enumerated in the following steps:

a) Making of Clear PET Flakes

As per the patented procedure of the inventors (I.P.No. 180047) 100 kg to 1300 kg of the PCR PET Flakes were made ready from the used PET bottles.

b) Addition of Catalysts and Additives

PTA/MEG slurry in the ratio of 70:30 wt % with appropriate quantity of IPA as needed is made ready in the paste preparation vessel. The catalysts in the form of $Sb_2O_3$ (100 to 300 ppm), Germanium Dioxide (5 to 50 ppm) and Organic Titanates (5 to 100 ppm) are added in the paste preparation vessel. The coloring agents like Co are added in the range of 20 to 100 ppm in the paste in the form of Cobalt acetate. To support Co, the color toners such as Red and Blue and Optical Brightener are added in the range of 0.2 to 3.0 ppm.

c) Batch Processing

At the end of the esterification/glycolysis of PTA/Flakes oligomer (BHET/Prepolymer) that is formed in-situ, is not separated but transferred to the polyreactor via a filter for further polymerization. So the material from esterifier/pre-polyreactor is not taken out for some other process and charged into the polyreactor. The present process is a batch process consisting of two/three reactors viz. Esterifier/Prepolymerizer and Polyreactor and each batch is processed through these reactors.

Initially the esterifier is empty and having the temperature of 240 to 270° C. The esterifier is provided with an agitator, internal heating coils and an external heating limpet. The esterifier is maintained under the inert atmosphere by using the Nitrogen. The reactor pressure is maintained in the range of 0.5 to 3.0 $Kgs/cm^2$ The ingestion of PTA/IPA/MEG is done and after the ingestion of around 500-1000 kg of the paste, the PET flakes that were kept charged in the small silo above the reactor are dosed in the esterifier using the nitrogen pressure slightly above the esterifier pressure to prevent the possible air entry to the reactor.

Further, ingestion of PTA/MEG paste is resumed and the charged PET flakes start undergoing the melting process and simultaneously they undergo the glycolysis reaction with the available MEG in the system. After the required quantity ingestion of the paste, further ingestion is stopped.

In the present process, simultaneous reactions of Esterification (PTA conversion to BHET i.e. prepolymer or oligomer), Melting/Glycolysis of PET flakes takes place in the esterification reactor which is a unique feature in the present process.

Thus the complete mass gets converted to the BHET viz., prepolymer/oligomer with the degree of polymerization to the tune of 5 to 10. After getting this first batch converted, the BHET remains in the esterifier and acts as the PREPOLYMER HEEL. This helps to hasten all the above-mentioned unit process in the subsequent batches.

After achieving the desired end temperature of 250 to 275° C. and the conversion of 98.5% the prepolymer melt is held in the esterifier for a period of 15 to 45 minutes for equilibration to have a controlled DP of 5 to 10. The prepolymer is then filtered through a 20 micron filter and transferred to the prepolyreactor under nitrogen pressure.

The pre-polyreactor is equipped with an agitator, internal heating coil and external limpet coil. The prepolymer is processed by gradually reducing the pressure to 5-15 mbar (abs.) and increasing the temperature to about 260-285° C. After an increase in DP the melt is transferred after filtration to the Polymerization reactor, which is provided with a special agitator, condenser and a fine vacuum system.

The polymerization takes place in the presence of a combination of catalysts viz. Antimony Trioxide, Germanium Dioxide and Organic Titanates (e.g. Tetraisopropylorthotitanate). Here the polymer melt with a low starting DP is raised to its required final high DP of 140-160 by reducing the pressure to as low as 0.1-0.5 mbar (abs.) and the temperature to about 290-298° C. The polymer melt is stabilized with heat stabilizers OPA/TEPA. Optical Brighteners and Toners are added at appropriate quantities to achieve the desired color of the final polymer. The polymer melt is extruded under nitrogen pressure and converted into pellets. This amorphous RPET polymer is further solid state polymerized to an intrinsic viscosity (IV) of 0.80-0.86. Since, all the additives are food grade the RPET resin so produced is suitable for food contact application.

Following are the Specifications of Raw Materials and Additives Used in the Present Process The additives/catalysts used are:
  Pure Isophthalic Acid (PIA or IPA)—2.5 Mole % maximum
  Antimony Trioxide—300 ppm maximum as Sb
  Germanium Oxide—Germanium Oxide solution TGO from Teckcominco Metals Limited, Canada—or similar Food grade approved special Germanium Oxide, 40 ppm maximum as Germanium Oxide
  Cobalt Acetate—100 ppm maximum as Co
  Triethylphosphonoacetate (TEPA)—600 ppm maximum as TEPA
  Organic Titanates—eg. Tetraisopropylorthotitanate
  Optical Brightener—CIBA UVITEX OB-ONE from CIBA Specialty Chemicals, India—or similar Food grade approved special Optical Brightener—5 ppm maximum
  Blue and Red Toners
  Any other additive as required for specific application of product.

Specifications of Raw Materials and Additives:

| Pure Terephthalic Acid (PTA) | |
| --- | --- |
| Acid Number (mg KOH/g) | 675 ± 2 |
| Moisture (% Wt.) | 0.5 max |
| Ash (% Wt.) | 0.0015 max |
| Iron (ppm) | 1.0 max |
| Color (CIE Lab-b*) | +0.5 max |
| Bulk Density (g/cc) | 1.10 ± 0.05 |
| Foreign Particles | Nil |
| Average Particle size (micron) | 110 ± 20 |
| Mono Ethylene Glycol | |
| Moisture (% Wt.) | 0.5 max |
| Acidity (% Wt.) (as Acetic Acid) | 0.01 max |
| Specific Gravity at 20° C. | 1.115 ± 0.001 |
| Chlorides (as Cl) ppm | 5 max |
| Iron (as Fe +++) ppm | 0.15 max |
| Residue (% Wt.) | 0.0015 max |
| Color (HU) | 10 max |
| Appearance | Colorless clear liquid |
|  | No external contamination |
| Miscibility with water | 100% |
| DEG (% Wt.) | 0.1 max |
| Distillation range (° C.): | |
| 1st drop | 190 min |
| 5 ml | 196 max |
| 95 ml | 199 max |
| Dry point | 200 max |
| Ultraviolet Transmittance (%) at: | |
| 350 nm | 98 min |
| 275 nm | 95 min |
| 250 nm | 90 min |
| 220 nm | 70 min |
| PCR PET Flake | |
| Intrinsic Viscosity (dl/g) | 0.4 min |
| 'b' Color (CIE Lab) | 4.0 max |
| Fines <3 mm (%) | 0.4 max |

-continued

| | |
|---|---|
| Flake pH | 7.0 ± 0.5 |
| Moisture content (%) | 1.0 max |
| Density (g/cc) | 1.335 min |
| Bulk Density (kg/m$^3$) | 0.30-0.38 |
| Floatable Contamination (ppm) | 2 max |
| PVC Contamination (ppm) | 10 max |
| Metal Contamination (ppm) | 5 max |
| Other non melting (ppm) | 10 max |
| Pure Isophthalic Acid (IPA) | |
| Acid Number (mg KOH/g) | 675 ± 2 |
| Moisture (% Wt.) | 0.5 max |
| Ash (% Wt.) | 0.0015 max |
| Iron (ppm) | 1.0 max |
| Color (CIE Lab-b*) | +0.5 max |
| Bulk Density (g/cc) | 1.10 ± 0.05 |
| Foreign Particles | Nil |
| Average Particle size (micron) | 110 ± 20 |
| Antimony Trioxide | |
| Purity (% as Sb$_2$O$_3$) | 99.0 min |
| Moisture (% Wt.) | 0.5 max |
| Iron (ppm) | 30 max |
| Chlorides (ppm) | 100 max |
| Germanium Oxide | |
| Germanium Oxide content (% Wt.) | 10 ± 2 |
| Moisture (% Wt.) | 33.0 ± 1.0 |
| Specific Gravity | 1.333 ± 0.002 |
| Cobalt Acetate | |
| Appearance | Violet Red or Rose, Crystals/Powder Purity (%) |
| 1. As Cobalt | 22 min |
| 2. As Cobalt Acetate | 92 min |
| Moisture (% Wt.) | 28.0 ± 2.0 |
| Solubility in hot Ethylene | |
| Glycol at 80-100° C. | Soluble |
| Foreign Particles | Nil |
| Formula | Co(CH$_3$COO)$_2$.4H$_2$O |
| Blue Toner | |
| Appearance (visual inspection) | Labeled as POLYSYNTHRIN BLUE RBL procured from Clariant India limited or similar Food grade approved special Blue Toner - 3 ppm maximum |
| Red Toner | |
| | Labeled as POLYSYNTHRIN RED GFP procured from Clariant India limited or similar Food grade approved special Red Toner - 3 ppm maximum |
| Triethylphosphonoacetate (TEPA) | |
| | Triethylphosphonoacetate from Rhodia - Clear, colorless liquid |
| Phosphorous content (%) | 13.8 |
| Organic Titanates | |
| Tetraisopropylorthotitanate | C$_{12}$H$_{28}$O$_4$Ti<br>M.W. 284.26<br>M.P. 14-17° C.<br>B.P.$_{10}$ 104° C.<br>D$_4^{20}$ 0.96 |
| Optical Brightner | |
| | Labeled as CIBA UVITEX OB-ONE from CIBA Speciality Chemicals, India - Food grade approved or similar food approved grades. |

The Physico-Chemical Properties of the Product as Obtained from the Process of the Present Invention are as Follows:

| | |
|---|---|
| Amorphous Resin | |
| I.V | 0.55 to 0.62 dl/g (as desired) |
| COOH No | Max. 40 meq/kg |
| Acetaldehyde | Max. 150 |
| DEG . . . | 1.2 ± 0.1 wt % |
| Colour (CIE Lab Values) | |
| L = 67 ± 2 | |
| b = −5.0 ± 0.1 | |
| SSP Resin | |
| I.V | 0.80-0.86 dl/g |
| COOH No | ≦30 meq/kg |
| Acetaldehyde | ≦1.0 ppm |
| DEG . . . | 1 ± 0.2 wt. % |
| Colour (CIE Lab. Values) | |
| L = min 74 | |
| b = max 0 | |

The Following Examples are Provided for Illustration Only and Should not be Construed to Limit the Scope of the Invention

EXAMPLES

Example 1

Homopolymer Without PCR Flakes 10.4 kg of Pure Terephthalic Acid (PTA) and 4 ltr of Mono Ethylene Glycol (MEG) are charged into a reactor which is provided with heating systems, agitator, distilation columns, pressurising and vacuum systems and discharge ports to take out the finished polymer material as a strand for granulation to polyester chips. Additives are added such that in the polymer the level of Antimony is 300 ppm added as Sb$_2$O$_3$, Cobalt 60 ppm added as Cobalt Acetate and Phosphorous 54 ppm added as Trethylphophonoacetate (TEPA).

Example 2

Copolyester Without PCR Flakes

Example-1 is carried out with 10.16 kg of PTA, 240 g of Isophthalic Acid (IPA) and 4 ltr of MEG keeping the additives same.

All further Examples are with various % of PCR Bottle Flakes

Example 3

9.34 kg of PTA, 1.2 kg of cleaned PET bottle flakes (post consumer recycled-PCR) corresponding to 10% PCRPET in the polymer and 3.6 ltr of MEG are charged into the reactor and polycondensed with additives at the following levels in the final polymer. Antimony 150 ppm, Germanium Dioxide 20 ppm, Cobalt 60 ppm, Ti 25 ppm added as organic titanate (Tetra Isopropyl Titanate-TIPT), Phosphorous 54 ppm added as TEPA.

Example 4

Example-3 was repeated with 8.3 kg of PTA, 2.4 kg of PCRPET flakes corresponding to 20% in the polymer and 3.2 ltr of MEG. The additives are same as in Example-3.

Example 5

The polycondensation charge consisted of 7.26 kg of PTA, 3.6 kg of PCRPET flakes corresponding to 30% in the polymer and 2.8 ltr of MEG. Additives are added in such a way the final polymer contained 150 ppm Antimony, 20 ppm Germanium Dioxide, 60 ppm Cobalt, Ti 25 ppm added as TIPT and 54 ppm Phosphorous added as Orthophosphoric Acid along with 1.5 ppm each of Polysynthrin Blue toner and Uvitex optical brightener.

Example 6

Example-5 is repeated with 6.225 kg of PTA, 4.8 kg of PCRPET flakes corresponding to 40% and 2.4 ltr of MEG keeping the additive levels same.

Example 7

The poycondensation charge consisted of 5.188 kg of PTA, 6.0 kg of PCRPET flakes corresponding to 50% and 2 ltr of MEG. Additives are added in such a way the final polymer contained 150 ppm Antimony, 20 ppm Germanium Dioxide, 60 ppm Cobalt, 25 ppm Ti added as TIPT and 54 ppm Phosphorous added as TEPA along with 1.5 ppm each of Polysynthrin Red toner and Uvitex optical brightener.

Example 8

Example-7 is repeated and instead of Polysynthrin Red toner Blue toner is added.

The Properties of Amorphous Polymer Chips Obtained from these Examples are Given in Table 1.

Table-II gives the Esterification and Polycondensation Cycle Times for the Examples 1 to 8.

TABLE II

| EXAMPLE-Nos | PCR FLAKES % | ESTERIFICATION TIME (Mins.) | POLYCONDENSATION TIME (Mins.) |
| --- | --- | --- | --- |
| 1 | Nil | 335 | 215 |
| 2 | Nil | 315 | 211 |
| 3 | 10 | 327 | 208 |
| 4 | 20 | 334 | 203 |
| 5 | 30 | 327 | 198 |
| 6 | 40 | 295 | 203 |
| 7 | 50 | 310 | 204 |
| 8 | 50 | 298 | 210 |

The amorphous polymer samples from Examples 1 to 8 were Solid State Polymerized (SSP) to upgrade the I.V. to about 0.85 and their properties measured and these are given in Table-III.

TABLE III

Properties of SSP polymer samples.

| EXAMPLE No. & % PCR FLAKES | I.V. | COOH No. meq/kg | AA ppm | HAZE | L* | a* | b* |
| --- | --- | --- | --- | --- | --- | --- | --- |
| 1 Nil | 0.855 | 26 | 0.80 | 4.8 | 78.6 | −2.4 | −0.3 |
| 2 Nil | 0.846 | 27 | 0.55 | 5.9 | 79.7 | −2.2 | −1.9 |
| 3 10 | 0.850 | 24 | 0.64 | 5.1 | 78.2 | −3.0 | −1.6 |
| 4 20 | 0.847 | 26 | 0.70 | 4.8 | 77.5 | −2.9 | −1.8 |
| 5 30 | 0.853 | 23 | 0.69 | 4.3 | 77.9 | −1.9 | −1.4 |
| 6 40 | 0.848 | 26 | 0.79 | 4.7 | 76.6 | −1.7 | −0.9 |
| 7 50 | 0.852 | 28 | 0.81 | 3.9 | 77.1 | −2.0 | −1.0 |
| 8 50 | 0.843 | 26 | 0.77 | 4.0 | 77.6 | −1.9 | −0.8 |

L* a* b* are CIE values.

As can be seen from the examples data in Table-I by making use of the combination additives even with as high

TABLE 1

Properties of Amorphous Polymer

| EXAMPLE No. | % PCR FLAKES | ADDITIVES LEVELS PPM | | | | | | POLYMER PROPERTIES | | | | | | |
| --- | --- | --- | --- | --- | --- | --- | --- | --- | --- | --- | --- | --- | --- | --- |
| | | Sb | Ge | Co | TIPT | 'P' as TEPA | 'P' as OPA | I.V. dl/g | COOH No. meq/kg | AA ppm | HAZE | L* | a* | b* |
| 1 | Nil | 300 | Nil | 60 | Nil | 54 | Nil | 0.616 | 30 | 87 | 6.9 | 73.1 | −0.40 | −5.9 |
| 2 | Nil | 300 | Nil | 60 | Nil | 54 | Nil | 0.598 | 37 | 83 | 8.1 | 72.0 | −1.5 | −3.7 |
| 3 | 10 | 150 | 20 | 60 | 25 | 54 | Nil | 0.622 | 37 | 46 | 8.4 | 69.4 | −1.4 | −2.9 |
| 4 | 20 | 150 | 20 | 60 | 25 | 54 | Nil | 0.605 | 29 | 63 | 12.4 | 70.4 | −2.2 | −3.9 |
| 5* | 30 | 150 | 20 | 60 | 25 | Nil | 54 | 0.601 | 39 | 69 | 6.3 | 71.2 | −2.3 | −3.7 |
| 6* | 40 | 150 | 20 | 60 | 25 | Nil | 54 | 0.616 | 47 | 57 | 7.2 | 72.1 | −2.6 | −2.6 |
| 7** | 50 | 150 | 20 | 60 | 25 | 54 | Nil | 0.618 | 45 | 49 | 5.4 | 72.4 | −2.7 | −3.6 |
| 8* | 50 | 150 | 20 | 60 | 25 | 54 | Nil | 0.609 | 30 | 68 | 6.4 | 71.2 | −2.8 | −0.1 |

*1.5 ppm each of Polysynthrin Blue Toner and Uvitex Optical Brightener are added
**1.5 ppm each of Polysynthrin Red Toner and Uvitex Optical Brightener are added
L* a* b* are CIE values.

as 50% of PCR bottle flakes it is possible to get the amorphous resin with properties like I.V., COOH No., Acetaldehyde (AA), Haze and CIE Lab values similar to that obtained from virgin raw materials.

It can also been seen from all the examples that no additional MEG has been used where in spite of increasing the % of PCR bottle flakes as high as 50.

Data in Table-II also clearly shows that there is no additional cycle time involved in any of the examples with PCR bottle flakes in spite of not using the prepolymer heel.

Comparison of the properties of the SSP polymer samples as given in Table-III. Here again the polymer properties of the resin at various % levels of PCR bottle flakes are similar to the polymer obtained from virgin raw material.

Distinctive Features of the Present Invention Vis-á-Vis Prior Art Processes are Depicted in the Following Table

TABLE

| Parameter | Prior Art | Present Invention |
|---|---|---|
| Feed Material | Only Bottle Flakes or Other Polyester Wastes | Combination of PCR Bottle Flakes and virgin raw materials viz., PTA & MEG |
| Catalyst | Single Catalyst | Combination of $Sb_2O_3$ and $GeO_2$ and Organic Titanates along with Optical Brighteners and Toners |
| Prepolymer Heel | Used with virgin feed stock | In the combined system containing PCR Bottle Flakes and PTA + MEG. |
| Process | Only Glycolysis | Melting, Glycolysis, and Esterification occurring simultaneously. |

Advantages of the Present Invention are as Follows:

1. The present invention adopts a combination of virgin raw materials and PCR PET flakes as a starting material.
2. The final product produced with max. 50% PCR PET and rest virgin material is the same as that produced from 100% virgin raw material.
3. Flakes are subjected to the minimum processing time so that quality does not suffer.
4. Utilization of the pre polymer heel for esterification/glycolysis in the continuous process.
5. The overall process ensures minimum processing time and therefore there is least thermal degradation.
6. The present process adopts a unique catalyst combination.
7. The prepolymer gets 100% filtered through a fine $\leq 20$ micron filter.
8. The continuous process involves simultaneous melting, glycolysis and repolymerization of PCR PET along with virgin raw materials in the presence of a prepolymer heel.
9. The colour of the product is similar to the product made with virgin raw materials and Acetaldehyde (AA) and Diethyleneglycol (DEG) contents also do not get affected even though the process is one of recycle with PCRPET flakes.
10. In spite of replacing the virgin raw material PTA up to a maximum of 50% of PCR PET flakes, the overall processing time remains the same as virgin materials' processing time. Hence, no extra time is taken by flakes for their reaction.

I claim:

1. A process for the preparation of a high molecular weight food grade polyethyleneterephthalate, said process comprising the steps of:
   (a) processing by adding PCRPET flakes to the paste form of virgin PTA, isophthalic acid(IPA), monoethylene glycol(MEG) and additives in the esterification reactor to obtain an esterified material,
   (b) retaining about 20-30% of the esterified material of step (a) in the esterification reactor as a prepolymer heel, and filtering the rest of the esterified prepolymer material to obtain a prepolymer material filtrate of uniform quality,
   (c) transferring the filtrate of step (b) into a prepoly reactor while maintaining a temperature in the range of 240-255° C. for a maximum period of 60 minutes to achieve an I.V. of about 0.3 dl/g,
   (d) charging the material of step (c) into an autoclave at a temperature in the range of 284-300° C. to achieve a degree of polymerization in the range of 100-110 to obtain an amorphous polymer resin/melt,
   (e) subjecting the amorphous polymer resin/melt of step (d) to solid state polymerization to obtain food grade crystalline PET, and
   (f) preferably continuing the process cycle by adding an appropriate quantity of PCRPET flakes, PTA IPA and MEG to the retained prepolymer heel of step (b) and performing steps (c) to (e) to obtain continuous production of crystalline food grade PET resin.

2. The process as claimed in claim 1, wherein the amount of PCRPET fakes is in the range up to a maximum of 50% of the PTA and IPA used for the batch.

3. The process as claimed in claim 1, wherein the additives are selected front catalysts, optical brighteners, toners and heat stabilizers.

4. The process as claimed in claim 3, wherein the catalysts are selected from antimony trioxide, germanium-di-oxide or a combination thereof.

5. The process as claimed in claim 3, wherein the optical brighteners are selected from commercially available food grade brighteners.

6. The process as claimed in claim 3, wherein the heat stabilizers are selected from the group consisting of TEPA, organic titanates and other similar materials.

7. The process as claimed in claim 1. wherein the esterification reaction in step (a) is carried out at a temperature in the range of about 240-270° C., and a pressure in the range of 0.5 to 3 kgs/cm² under nitrogen atmosphere for a time period of about 120 minutes.

8. The process as claimed in claim 1, wherein the degree of polymerization of the prepolymer is in the range of about 5 to 10.

9. The process as claimed in claim 1, wherein the filtration is carried out using filter-material of size about $\leq 20$ micron under nitrogen pressure.

10. The process as claimed in claim 1, wherein the polymerization reaction in the prepoly reactor is carried out at a temperature range of 240-255° C. for a maximum period of 60 minutes with a degree of polymerization of the prepolymer in the range of 5 to 10.

11. The process as claimed in claim 1, wherein step (d) is carried out in an autoclave at a temperature in the range of 284-300° C. to achieve a degree of polymerization in the range of 100-110 to obtain amorphous polymer.

12. The process as claimed in claim 1, wherein the polymer melt of step (d) is stabilized with heat stabilizers.

13. The process as claimed in claim 1, wherein the color of the polymer melt of step (d) is improved by the addition of optical toners.

14. The process as claimed in claim 1, wherein the amorphous polymer of step (d) is extruded under nitrogen pressure and converted into chips/granules.

15. The process as claimed in claim 1, wherein the solid state polymerization of step (e) is carried out at a temperature in the range of 210-240° C. for a period ranging from ten to sixteen hours resulting in a DP of about 140-160.

16. The process as claimed in claim 1, wherein PCRPET flakes are obtained by collecting post consumer PET bottles scrap, cleaning the bottles with caustic, crushing to obtain flakes, further caustic cleaning of the flakes, turbo washing and washing with DM water to obtain flakes which are free from any impurities.

17. The process as claimed in claim 1 which is carried out as a continuous process for production of crystalline food grade PCRPET by adding PTA, IPA, MEG and other additives to the prepolymer heel content of up to 30%.

18. The process as claimed in claim 1, wherein the repolymerized PET is obtained from a maximum of 50% of post consumer recycled PET bottle flakes (PCRPET) and has properties similar to the PET produced from virgin raw materials and is suitable for manufacturing PET bottles used in food contact application.

* * * * *